(12) United States Patent
Pendray et al.

(10) Patent No.: US 8,912,672 B2
(45) Date of Patent: Dec. 16, 2014

(54) CONTROL OF AN ENGINE-DRIVEN GENERATOR TO ADDRESS TRANSIENTS OF AN ELECTRICAL POWER GRID CONNECTED THERETO

(75) Inventors: John R. Pendray, Minneapolis, MN (US); Patrick M. Pierz, Columbus, IN (US); Bradford K. Palmer, Ham Lake, MN (US); Andrew Kitchen, Daventry (GB)

(73) Assignee: Cummins Power Generator IP, Inc., Minneapolis, MN (US)

( * ) Notice: Subject to any disclaimer, the term of this patent is extended or adjusted under 35 U.S.C. 154(b) by 280 days.

(21) Appl. No.: 13/301,481

(22) Filed: Nov. 21, 2011

(65) Prior Publication Data

US 2012/0175876 A1 Jul. 12, 2012

Related U.S. Application Data

(63) Continuation-in-part of application No. PCT/US2010/001497, filed on May 20, 2010.

(60) Provisional application No. 61/216,662, filed on May 20, 2009.

(51) Int. Cl.
*H02P 9/04* (2006.01)
*H02P 9/10* (2006.01)
(Continued)

(52) U.S. Cl.
CPC *H02P 9/10* (2013.01); *F02D 19/02* (2013.01); *F02D 29/06* (2013.01); *F02P 5/15* (2013.01); *H02P 9/102* (2013.01); *H02P 9/105* (2013.01); *H02P 9/107* (2013.01); *H02P 9/04* (2013.01); *H02J 3/46* (2013.01); *H02P 2009/004* (2013.01); *Y02T 10/32* (2013.01); *Y02T 10/46* (2013.01); *F02M 21/0212* (2013.01); *F02M 21/0215* (2013.01)
USPC .......................................................... 290/41

(58) Field of Classification Search
CPC ............................ H02P 9/04; H02P 2009/009
USPC .......................................................... 290/41
See application file for complete search history.

(56) References Cited

U.S. PATENT DOCUMENTS 4,262,209 A 4/1981 Berner
6,072,302 A 6/2000 Underwood et al.
(Continued)

FOREIGN PATENT DOCUMENTS

CN 201181925 1/2009
CN 201181925 Y 1/2009
(Continued)

OTHER PUBLICATIONS

European Patent Office, Communication Pursuant to Article 94(3) EPC, Examination Report, Application No. 10 724 918.7, Mar. 11, 2013, 5 pages.
(Continued)

*Primary Examiner* — Tulsidas C Patel
*Assistant Examiner* — Sean Gugger
(74) *Attorney, Agent, or Firm* — Foley & Lardner LLP

(57) ABSTRACT

A technique for providing electric power to an electric power utility grid includes driving an electric power alternator coupled to the grid with a spark-ignited or direct injection internal combustion engine; detecting a change in electrical loading of the alternator; in response to the change, adjusting parameters of the engine and/or generator to adjust power provided by the engine. In one further forms of this technique, the adjusting of parameters for the engine includes retarding spark timing and/or interrupting the spark ignition; reducing or retarding direct injection timing or fuel amount and/or interrupting the direct injection; and/or the adjusting of parameters for the generator including increasing the field of the alternator or adding an electrical load.

20 Claims, 7 Drawing Sheets

(51) Int. Cl.
*F02D 19/02* (2006.01)
*F02D 29/06* (2006.01)
*F02P 5/15* (2006.01)
*H02J 3/46* (2006.01)
*H02P 9/00* (2006.01)
*F02M 21/02* (2006.01)

(56) References Cited

U.S. PATENT DOCUMENTS

| | | |
|---|---|---|
| 6,285,178 B1 | 9/2001 | Ball et al. |
| 6,555,929 B1 * | 4/2003 | Eaton et al. ................ 290/40 B |
| 6,664,654 B2 | 12/2003 | Wall et al. |
| 6,921,985 B2 | 7/2005 | Janssen et al. |
| 7,122,916 B2 | 10/2006 | Nguyen et al. |
| 7,233,129 B2 | 6/2007 | Erdman et al. |
| 7,339,355 B2 | 3/2008 | Erdman et al. |
| 7,394,166 B2 | 7/2008 | Teichmann et al. |
| 7,423,412 B2 | 9/2008 | Weng et al. |
| 7,432,686 B2 | 10/2008 | Erdman et al. |
| 7,495,879 B2 | 2/2009 | Thexton et al. |
| 7,514,907 B2 | 4/2009 | Rajda et al. |
| 7,535,120 B2 | 5/2009 | Erdman et al. |
| 7,573,732 B2 | 8/2009 | Teichmann et al. |
| 7,622,815 B2 | 11/2009 | Rivas et al. |
| 7,629,699 B2 | 12/2009 | Annen et al. |
| 7,629,705 B2 | 12/2009 | Barker et al. |
| 7,701,087 B2 | 4/2010 | Eckroad et al. |
| 7,709,972 B2 | 5/2010 | Arinaga et al. |
| 2002/0175521 A1 * | 11/2002 | Dunsworth et al. ........ 290/40 A |
| 2004/0144360 A1 * | 7/2004 | Surnilla et al. ........... 123/339.11 |
| 2006/0267560 A1 | 11/2006 | Rajda et al. |
| 2007/0130952 A1 | 6/2007 | Copen |
| 2007/0272505 A1 * | 11/2007 | Lhote et al. ................ 188/273 |
| 2007/0278797 A1 | 12/2007 | Flannery et al. |
| 2008/0121444 A1 | 5/2008 | Bauer |
| 2008/0150285 A1 | 6/2008 | Corcelles Pereira et al. |
| 2009/0058086 A1 * | 3/2009 | Arinaga et al. ............. 290/44 |
| 2009/0229247 A1 | 9/2009 | Ito et al. |
| 2009/0230689 A1 | 9/2009 | Burra et al. |
| 2010/0002475 A1 | 1/2010 | Folts et al. |
| 2011/0180043 A1 | 7/2011 | Falkowski et al. |
| 2012/0104754 A1 * | 5/2012 | Rudolf et al. ............. 290/44 |

FOREIGN PATENT DOCUMENTS

| | | |
|---|---|---|
| DE | 662880 | 6/1938 |
| EP | 1925492 A2 | 5/2008 |
| WO | WO 2010085988 A2 * | 8/2010 |

OTHER PUBLICATIONS

European Examination Report, European Patent Office, EP10724918.7, Cummins Power Generation IP, Inc., Oct. 30, 2012.

International Preliminary Report on Patentability, ISA/EPO, PCT/US2010/001497, Cummins Power Generation IP, Inc., Nov. 22, 2011.

International Search Report and Written Opinion, ISA/EPO, PCT/US2010/001497, Cummins Power Generation IP, Inc., Aug. 24, 2010.

International Search Report and Written Opinion, International Application No. PCT/US2012/066247, Date of Mailing: Feb. 8, 2013, 9 pages.

Translation of Chinese Office Action for Chinese Application No. 201080027366, mailed Dec. 2, 2013, 8 pages.

\* cited by examiner

CONTROL OF AN ENGINE-DRIVEN GENERATOR TO ADDRESS TRANSIENTS OF AN ELECTRICAL POWER GRID CONNECTED THERETO

CROSS-REFERENCE TO RELATED APPLICATIONS

The present application is continuation-in-part of International Patent Application Number PCT/US2010/001497 filed May 20, 2010, which claims the benefit of U.S. Provisional Patent Application No. 61/216,662 filed May 20, 2009, each of which is hereby incorporated by reference in its entirety and for all purposes.

BACKGROUND

The present application relates to electrical power generation, and more particularly, but not exclusively to techniques to address electric power grid disruptions, faults, and load transients.

During electrical grid disruptions the voltage of the grid can fluctuate rapidly. Under certain conditions, it may be desirable to maintain the grid connection of an engine/generator set (genset) when the grid voltage drops—designated a Low Voltage Ride-Through (LVRT). During a low-voltage event, the generator can lose synchronization with the grid due to the inability of the engine to respond rapidly to the lower power output demand, with the phase angle deviation overshooting due to the now too high engine power output. In some cases, generator damage may be caused by a corresponding pole-slipped induced current when the grid voltage returns and the generator is out of synchronization.

Further, when a load change or momentary electrical fault results in a grid voltage drop, the engine may attempt to compensate by increasing its speed. This increase in speed can result in an unacceptable increase in frequency and/or phase angle deviation of the output voltage. This situation is of particular concern in utility paralleled applications.

Moreover, a line fault event can suppress the voltage to zero and then allow it to return in a period of time that is shorter than a conventional engine and the genset control system can react. This situation can result in the generator phase angle being significantly different than the returning utility voltage phase angle, as the genset control is still reacting to the initial fault, possibly causing damage to the generating equipment. Under certain conditions, a genset with a Spark Ignition (SI) genset engine that mixes fuel and air upstream of the cylinder can be particularly vulnerable. While the quantity of fuel provided can be reduced at the first sign of a load change to ameliorate this result, the fuel charge already in existence can pose a problem. Diesel-fueled genset engines can be similarly vulnerable--even those diesel engines with direct or port fuel injection may perform undesirably during an LVRT event despite the ability to change the fuel charge without having an earlier formed fuel charge present in the intake.

One attempt to address grid fluctuations involves an increase in rotational inertia of the genset by increasing the size/weight of a genset flywheel and/or another rotating mass of the genset. While this approach of increasing rotational inertia may address the problem in part, typically it is not enough to provide desirable performance.

Thus, there remains a need for further contributions in this area of technology.

SUMMARY

One embodiment of the present invention is a unique electric power generation technique. Other embodiments include unique methods, systems, devices, and apparatus involving genset operation with respect to a low voltage ride-through operation of a unique electric power generation technique. Further embodiments, forms, objects, aspects, benefits, and advantages of the present invention shall become apparent from the figures and description provided herewith.

DETAILED DESCRIPTION OF REPRESENTATIVE EMBODIMENTS

Figure 1:
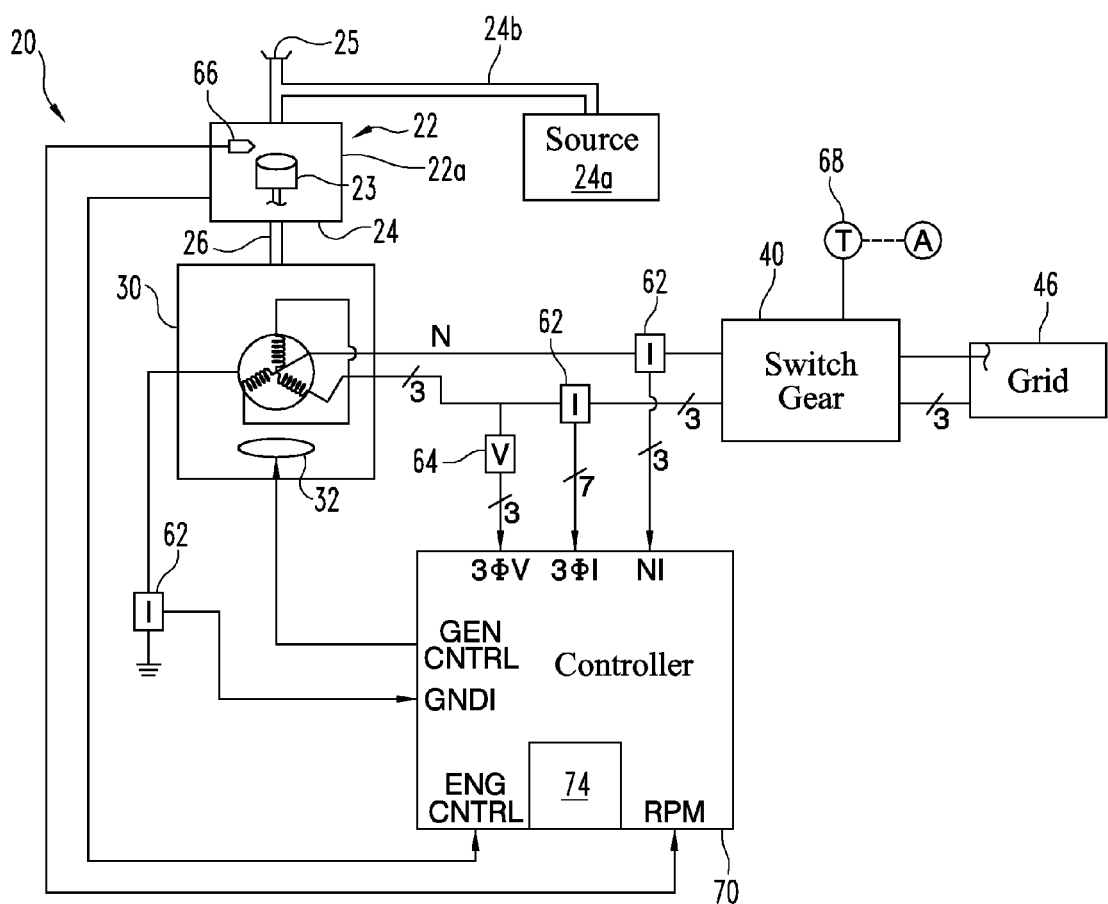
FIG. 1 is a diagrammatic view of an electrical power generation system including a genset with an electric power generator and an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application includes an electrical power system with a genset including an engine and an electric power generator or alternator. The genset may be coupled to provide electric power to a utility power grid. If there is a transient voltage drop on the grid, the system responds in any of a number of ways. For instance, the system may respond to a low voltage grid condition by temporarily routing excessive electric current from the generator through a resistive circuit. Alternatively or additionally, the system addresses abrupt changes in electrical loading that may be caused by an electrical line fault (such as a power grid voltage drop), by adjusting timing of the genset engine ignition and/or fueling in response and/or adjusting field control of the alternator in response. In the case of a spark-ignited engine, this timing adjustment may include retarding or inhibiting spark ignition of the genset engine. In the case of a fuel-injected diesel engine, whether of the direct injection or port injection type, this timing adjustment may include reducing the amount of fuel injected, retarding fuel injection and/or inhibiting fuel injection. In one form involving the latter, alternator field voltage is increased or even maximized (sometimes designated "full field") to correspondingly raise alternator current to increase the effective load and more closely balance the engine torque and alternator torque in response to the power grid voltage reduction. It will be appreciated by those of skill in the art that the genset may or may not operate as a primary or back-up generator and/or may or may not operate in parallel with one or more other gensets or electric power sources.

FIG. 1 depicts electrical power system 20 of a further embodiment of the present application. Electrical power system 20 includes an electric power generation genset subsystem 22. Genset 22 includes a prime mover 22a in the form of an internal combustion engine 24 and an alternator or electric power generator 30 to provide a three-phase, Alternating Current (AC), voltage at a target magnitude and frequency. In other arrangements, power may be supplied as a single phase or in such other configuration as would occur to those skilled in the art.

Engine 24 provides rotational mechanical power to generator 30 with rotary drive mechanism 26. Mechanism 26 can be a direct drive member, a device that provides a nonunity turn ratio, a torque converter, a transmission, and/or a different form of rotary linkage as would occur to those skilled in the art. In one arrangement, mechanism 26 is in the form of an extension of a crankshaft of engine 24 that serves as a rotor within generator 30 and thus the engine and generator have a one-to-one turning ratio. The depicted form of engine 24 includes one or more reciprocating pistons 23 in corresponding cylinders and is structured for Spark Ignition (SI) combustion. Correspondingly, engine 24 utilizes an SI compatible fuel such as natural gas, liquid petroleum gas, molecular hydrogen, a different gaseous fuel; gasoline; or other SI compatible fuel type. Alternatively, the genset engine can be of a Compression Ignition (CI) type (such as a diesel-fueled engine) utilizing a CI-compatible fuel such as diesel, JP8 or JP5. Fuel may be introduced through fuel injection. In certain diesel engine embodiments, fuel is injected on a per cylinder basis using direct injection or port injection—such that there is one fuel injector per cylinder—facilitating independent cylinder-by-cylinder fueling control. System 20 includes fuel source 24a, supplied by conduit 24b, which is coupled to engine 24. Fuel from source 24a is mixed with air from air intake 25 upstream of pistons 23 to provide a fuel charge thereto.

In other forms, engine 24, mechanism 26, and/or generator 30 can be of other types; engine 24 may be alternatively fueled and/or have different combustion modes or cycles; and/or a different form of engine-based prime mover 22a can be used to provide mechanical power to generator 30 as an alternative or addition to engine 24, like a CI engine type, a gas turbine engine type, a two-stroke engine type, among others. Different forms of prime mover 22a further include, without limitation, a wind turbine, a hydraulic turbine, and/or a steam turbine.

Generator 30 includes excitation field windings 32 operatively coupled to controller 70 to be further described hereinafter. The electric power output of generator 30 is coupled to switchgear 40 to selectively couple and decouple the generator electric power output to/from the public utility power grid 46. For arrangements in which system 20 is dedicated to supply power to grid 46, switchgear 40 typically is in the form of breakers for each power line. Alternatively, for a stand-by or back-up power application of system 20, switchgear 40 would typically include a transfer switch coupled to grid 46 and a local electrical load (not shown). Furthermore, one or more transformers may be provided between switchgear 40 and the connection to grid 46 (not shown). In one nonlimiting implementation, genset 22 includes engine 24 in the form of a multiple-cylinder, reciprocating piston, gaseous-fueled SI type and generator 30 in the form of an alternator with a rotor, which may be provided on an extension of the engine crankshaft (not shown).

Electrical power system 20 further includes voltage sensors 64 to monitor the magnitude of voltage output by generator 30 on conductors 34. Sensors 64 may be in the form of circuitry that samples a voltage drop across a known resistance or the like. Electrical power system 20 further includes current sensors 62 that monitor magnitude of electric current flow through conductors 34, neutral (N), and ground (GND), in association with generator 30. Sensors 62 may be of a standard current transformer type or such other variety as would be known to those skilled in the art. Sensor 66 is of a standard type that provides a sensor signal representing rotational speed of engine 24. In some forms, the sensor signal of sensor 66 is representative of the frequency of the electric power output of generator 30; however, frequency of the electric power output can be determined using other techniques. Sensors 62, 64, and 66 are converted to a digital form for processing using standard techniques. Alternatively or additionally, in other embodiments, an analog form of sensor signal processing may be used.

Electrical power system 20 further includes controller 70 coupled to sensors 62, 64, and 66. Controller 70 may be provided with generator 30 as part of the power generation genset 22 and may be in the form of one controlling device for both engine 24 and generator 30 or may be in the form of two or more controlling devices such as a dedicated Engine Control Module (ECM) in communication with a dedicated generator/genset control module, just to name a few nonlimiting examples. In one particular form, engine 24, generator 30, and controller 70 are provided as integrated equipment. Controller 70 includes inputs from current sensors 62 corresponding to the three phases of the electrical output of generator 30 designated as "3ϕI," any detected neutral current designated as "NI," and any detected electric earth ground current designated as "GNDI." Sensors 64 provide voltages corresponding to the three-phase electric output of generator 24 designated as "3ϕV." The engine speed input from sensor 66 is designated as "RPM." Operation of engine 24 is regulated by controller 70 in response to signals therefrom.

Controller 70 includes memory 74. Controller 70 executes operating logic that defines various control, management, and/or regulation functions. This operating logic may be in the form of dedicated hardware, such as a hardwired state machine, programming instructions, and/or a different form as would occur to those skilled in the art. Controller 70 may be provided as a single component or a collection of operatively coupled components; and may be comprised of digital circuitry, analog circuitry, software, or a hybrid combination of any of these types. Controller 70 can include multiple processing units arranged to operate independently, in a pipeline processing arrangement, in a parallel processing arrangement, and/or such different arrangement as would occur to those skilled in the art. When controller 70 is of a multi-component form, it may have one or more components remotely located relative to the others. In one embodiment, controller 70 is a programmable microprocessing device of a solid-state, integrated circuit type that includes one or more processing units and memory. In one form, controller 70 can include a computer network interface to facilitate communications using one or more standard communication protocols. Such an interface may be used to report system status information, receive sensor/detector inputs, operator input/output, communicate other data used in its operation, perform remote debugging or monitoring of controller 70, and/or to receive operating logic updates in the form of programming instructions or the like. It should be appreciated that one or more operator input controls, such as a keyboard, pointer, switches, or the like; and one or more operator outputs, such as a display, alarm, indicator, or the like can be included in genset 22 with appropriate interfacing to controller 70.

Memory 74 may be comprised of one or more types including but not limited to semiconductor, magnetic, and/or optical varieties, and/or may be of a volatile and/or nonvolatile variety. In one form, memory 74 stores programming instructions executed by controller 70 to embody at least a portion of its operating logic. Alternatively or additionally, memory 74 stores data that is manipulated by the operating logic of controller 70. Controller 70 may include signal conditioners, modulators, demodulators, Arithmetic Logic Units (ALUs), Central Processing Units (CPUs), oscillators, control clocks, amplifiers, communication ports, delay devices, signal format converters (such as analog-to-digital and digital-to-analog converters), limiters, clamps, filters, power supplies, and the like as needed to perform various control, management, and regulation operations described in the present application.

Controller 70 may control/monitor a number of aspects of genset 22 operation, such as electrical load change/transience, electronic governor control, automatic voltage regulation, regulated short circuit current, engine speed sensing, engine fault monitor, overload/overcurrent fault, neutral current fault, earth ground fault, short circuit fault, automatic synchronization with other AC power sources, permissive paralleling with other generators, paralleling control, over/undervoltage faults, remote metering and control, generator start-up control, output power calculation and display, reverse power fault, real power load sharing control during parallel operation, reactive power load sharing control during parallel operation, built-in self-diagnostics, and provision for external diagnostics equipment, just to name a few. Two common control functions are: (1) the regulation of the frequency of the generator output waveform typically performed by adjusting engine operation and, (2) the regulation of the voltage and/or electric current produced by generator 30.

Having described various structural and relational aspects of system 20 and its constituents, various modes of operating system 20 are next described. These operating modes/processes can be implemented, as applicable, via the operating logic executed by controller 70 and/or using such other techniques as would occur to those skilled in the art.

Figure 7:
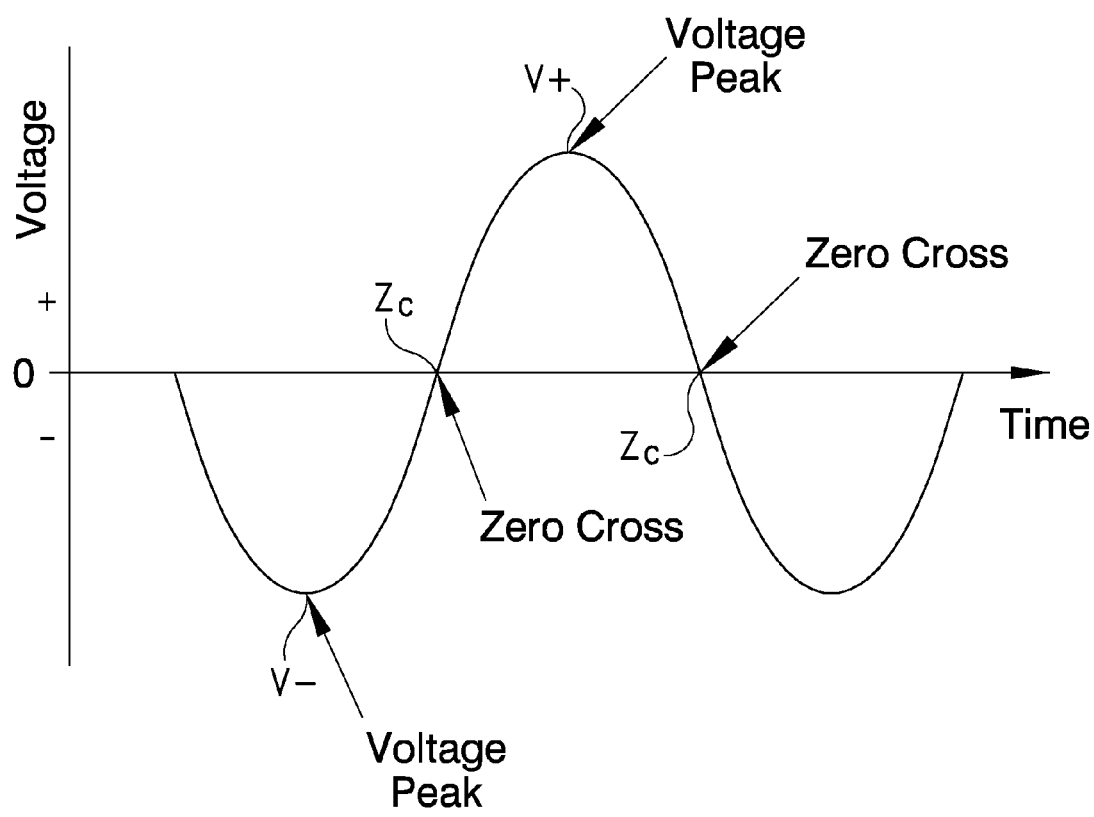
FIG. 7 is a graph depicting certain characteristics of an AC sinusoidal waveform with respect to time.

Among the operations that may be performed under the direction of operating logic executed by controller 70 is the detection of a low voltage condition on the grid 46 that is suitable for LVRT and to distinguish the same from other types of faults and failures. Certain applications of the present invention are directed to grid 46 having a nominally constant AC voltage and frequency, with a three-phase or single-phase sinusoidal waveform characteristic. Referring to FIG. 7, an exemplary sinusoidal AC waveform is illustrated in terms of voltage magnitude versus time to aid in explaining these aspects. Specifically, FIG. 7 depicts a few representative Zero Cross ($Z_C$) events where the polarity of the voltage magnitude switches between positive and negative, a representative positive voltage peak (V+), and a representative negative voltage peak (V−).

For such applications, in one embodiment an LVRT condition is determined as a function of two separate, but complementary aspects of the grid voltage: loss of voltage zero cross and low absolute voltage peak magnitude between two zero crosses. When the grid voltage is low, but still present, a "sag" detection module can be employed. In one form this sag detection module is implemented by a routine that: (a) digitally samples of the voltage signal at a sampling frequency>>the target AC frequency and stores the largest absolute peak value sampled until a zero cross event occurs, (b) when a zero cross event occurs, the peak sampled value is compared to a stored threshold value, and (c) if the peak sampled value is less than the threshold value a low voltage event is signaled and otherwise the peak sampled value is discarded and the routine repeats.

However, if there is a dead short circuit across the grid or other event that drives the grid voltage toward zero, it is possible the voltage will be at or near zero for an extended period and no zero cross events will occur. As a result, the sag detection module may continue sampling and never trigger the low voltage event. Accordingly, for certain applications, detection of LVRT further includes a loss of zero cross detection module. In one form, this loss of zero cross detection module is implemented by a routine that: (a) resets a timer at every zero cross, and (b) if this timer times out without being reset by a subsequent zero cross, a low voltage or no-zero cross fault is signaled. The zero cross loss timer has a time out value selected to be more than a one-half period of the target AC sinusoidal waveform, but less than a full period. In one implementation, a time out value of 0.75 of the target sinusoidal waveform period is selected to reject minor variations in grid frequency, but still detect a dead short circuit quickly enough for a timely system response.

Once a low voltage event is detected, controller 70 generates one or more signals to change spark ignition timing of engine 24 in certain embodiments. For an embodiment having a controller 70 comprised of a genset processor and a dedicated ECM, the genset processor signals the ECM to, for example, retard or inhibit the engine timing. This communication may take place as a high priority Controller Area Network (CAN) bus message; a dedicated hardwired line from an output of the genset processor to an interrupt input of a processor of the ECM; and/or using such other techniques as would occur to one skilled in the art.

Upon detecting a transient load situation with controller 70 (such as a low voltage on the power grid or "short circuit" condition) that is likely to result in an undesirable frequency change unless otherwise addressed, one inventive approach is to use a rapid retarding of the engine spark timing of a spark ignition (SI) engine to significantly reduce the engine power. The retarded spark timing significantly delays the combustion event and thus the combustion efficiency. In another inventive approach utilizing a CI engine in place of an SI engine, the fuel injection timing of a compression ignition (CI) engine is rapidly retarded to delay the combustion event and reduce combustion efficiency. Alternatively, the CI engine rapidly reduces the amount of fuel being injected to reduce engine power without a fuel injection timing change. Changes to the spark event for an SI engine, or the fuel injection event for a CI engine, can be made on a cycle-to-cycle basis in a sequential pattern of some or all cylinders of a multicylinder engine and therefore it can provide a near instantaneous engine power reduction in response to a reduction in genset load (such as a drop in grid voltage).

In one embodiment, the low voltage condition triggers retardation of ignition spark timing, direct injection timing, or reduced direct injection fueling relative to nominal using an "all-or-nothing" approach (or so-called "Bang-Bang" algorithm). For instance, subject to this condition being true, controller 70 directs a maximum level of retarded spark ignition timing when engine speed "n" exceeds a designated upper threshold (UT)—appreciating that n is proportional or in one-to-one correspondence with the frequency f of the AC voltage and current waveforms produced by the generator 30. Once n drops below a designated lower threshold (LT), controller 70 returns to nominal spark ignition timing. Controller 70 thus modulates between maximum retarded spark ignition timing and nominal spark ignition timing based on the engine speed n during the low voltage condition transient. The selection of the speed/frequency band (LT through UT) depends on the specific equipment characteristics and desired performance level. In the case of a CI engine type, the controller can direct the retardation of fuel injection timing and/or the reduction in the amount of fuel injected.

A complementary or alternative method is to more completely interrupt or inhibit the ignition event in a sequential pattern of some or all cylinders of a multicylinder engine or inhibit ignition in all cylinders entirely during the short transient event, for example. Likewise, in a CI engine embodiment, fuel amount is reduced to zero or fueling is otherwise withheld or skipped. Like the retarded spark timing for an SI engine (or the retarded fuel injection timing or reduced amount of fuel directly injected for a CI engine) this approach will also produce a near instantaneous response. As the control system adjusts the fuel system settings in response to the lower genset load, the spark timing or spark interruptions, or direct injection timing, direct injection interruptions, or reduced direct injection fueling, may be adjusted as necessary to restore a more normal setting.

Still another embodiment is to use the spark timing, spark interruption and/or direct injection timing to allow for a subsequent rapid increase in the load and corresponding increase in engine power output after a transient low voltage event. For instance, if during this same load disruption, the load were to suddenly reappear, the engine speed would fall dramatically if fueling changes were made as suggested above. However, by maintaining the previous high fueling state and rapidly returning the spark events or direct injection timing to a more normal state, the ability of the engine to handle the load will be rapidly restored. For applications including a turbocharger, it should be appreciated that use of retarded fuel injection or retarded spark ignition can maintain or even increase turbocharger rotational speed by correspondingly adjusting exhaust flow and/or temperature, such that the engine does not experience a so-called "turbo lag" upon resumption of the load as the turbocharger spools up again. In contrast, standard turbocharger engine systems tend to experience this lag because of the relatively low flow rate and/or temperature of the exhaust under light load or no load conditions.

Rapid load changes to a genset can cause unacceptable changes to the engine speed if the system is incapable of a sufficient response in magnitude and duration. Engines that can change the power generated from each cylinder on a cycle-to-cycle basis typically have the best chance of producing an acceptable outcome during these excursions.

Engines for which individual cylinder outputs can be changed on a cycle-by-cycle basis or near cycle-by-cycle basis include diesel and port/direct injected SI configurations. Spark ignition engines that introduce the fuel upstream of the cylinder (e.g. throttle body or carbureted) cannot affect this rapid change in load due to the transport delay through the intake between the fuel injection location and the cylinder. However, carbureting the fuel upstream of a turbocharger is common due to the lower cost of fuel system hardware and the ability to inject the fuel at low pressures (e.g. pipeline natural gas). The downside for such arrangements can be the aforementioned transport delay, which leads to poor transient response during rapid load changes.

It should be appreciated that spark timing retard, spark interruption, direct injection timing, fuel injection interruption or reduced injected fueling can be utilized together or in the alternative to address the load transient. Either technique can change the engine power in a desired fashion in response to a sudden change of load (such as a grid voltage drop). Spark or direct fuel injection timing alteration (for SI or CI engine-based systems respectively) is capable of rapidly changing the output of the power per cylinder by changing the timing of the combustion event and consequently the efficiency of the combustion process. For example, a significant reduction in genset load (such as a drop in power grid voltage) can be quickly sensed and the spark or fuel injection timing retarded as required to prevent a detrimental increase in speed. During this event, the fuel still burns in the cylinder, but the work extracted during the expansion process can be controllably diminished. Spark interruption or fuel injection interruption is accomplished by eliminating all spark or fuel injection events for a short time period or by sequentially interrupting cylinders as necessary to quickly reduce engine power. Any undesirable accumulation of unburned fuel in the exhaust with spark ignition (SI) engines can be limited by using a short duration of interruption, by skip firing in adjacent cylinders, and/or through various aftertreatment techniques.

Furthermore, with spark ignition (SI) engines if the load is rapidly fluctuating due, for example, to the rapid opening and closing of breakers on the system or grid, then the fueling can be left at a higher setting during the event; while at the same time, changes to the spark events (timing and/or interruption) can be immediately switched in and out to minimize undesirable changes in engine speed. With the previous fueling still in place, the rapid return of normal spark settings will result in a rapid increase in engine load as there is no lag time for fueling changes to be seen as the air/fuel mixture ratio being added to the engine and entrained in the intake has been left the same during the event. If the load change lasts longer than a predefined period of time, the control system may return the control of upstream fueling and spark events to their normal settings; returning the spark events to a normal timing setting and allowing the fueling to be reduced to reduce power output for what has proven to be a non-transient event. Fuel injection timing alteration or injected fuel amount reduction can be utilized with compression ignition (CI) engines to rapidly reduce and restore power as load returns.

During these transient events, controller 70 monitors frequency deviation and duration to determine total phase angle deviation. Spark ignition or fuel injection, controllable for each engine cylinder, can then be utilized to control engine speed/frequency to adjust the phase angle deviation back to the nominal value required. Fueling changes, if any, would also be determined by controller 70.

During an event where the voltage is forced to zero or near zero, controller 70 can generate a virtual voltage zero-crossing based on the last measured zero-cross, which may be useful when operating in synchronization with another large power source. This virtual zero-cross can be utilized as a timing reference signal for phase angle resynchronization. Alternately, the zero-cross reference signal could be supplied externally based on information transmitted by the other power source.

In some embodiments, it should be appreciated that aspects of standard genset load and speed/frequency controls may be in operation during transient events; however, these standard controls typically are subordinate to the transient technique(s) applied as described above until the transient event is over. In still another form, the spark or fuel injection control loop could be integrated into a more traditional control architecture in certain embodiments.

Figure 2:
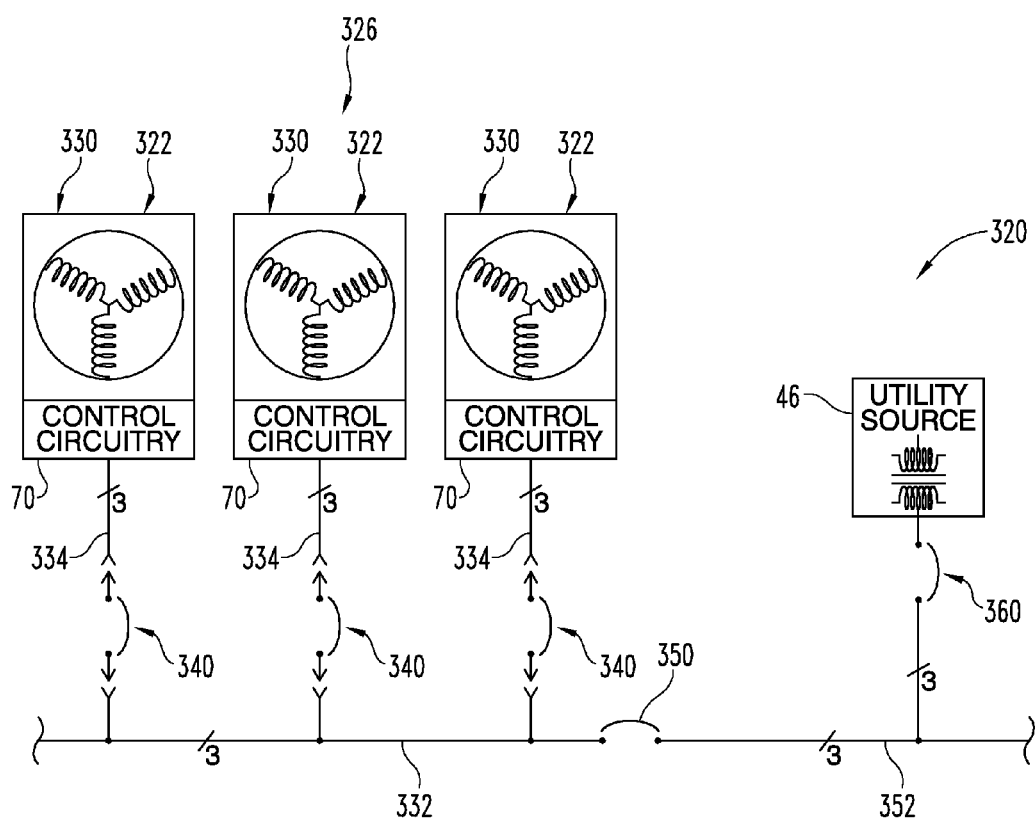
FIG. 2 is a diagrammatic view of yet a further electrical power system including parallel gensets.

Some or all of these techniques can be applied in a parallel generator system, such as electrical system 320 illustrated in FIG. 2; where like reference numerals refer to like features previously described. System 320 includes a number of electric power generation subsystems 322 each having electric output sensors of the type previously described (not shown), an engine or other prime mover (not shown), generator 330, and controller 70, respectively. Any of the generators 330 set forth in system 320 may be any of the types previously described, such as generator 30, or of a different type. Subsystems 322 are arranged for selective parallel operation to provide a corresponding parallel power source 326. Source 326 also includes power bus 332, generator feeder conductors, 334, and power breaker/switches 340, respectively. Each generator 330 of system 320 can be connected and disconnected selectively to power bus 332 by corresponding feeder conductors 334 through a respective power breaker/switch 340. Power bus 332 can be coupled to local power bus 352 by breaker/switch 350. Source 326 is then selectively connected to grid 46 by the closure of power breaker/switch 360 connected to power bus 352.

A further embodiment utilizes a series of resistors and switches to absorb extra energy during an LVRT event, maintaining relatively constant voltage upstream from the device. One example of this embodiment is illustrated as system 420 in FIG. 3; where like reference numerals refer to like features previously described. The switching/resistor device 422 also assists in maintaining engine speed to improve the engine's ability to maintain synchronization by absorbing the excess power that the grid would otherwise be consuming.

The switching speed determines the rate of controllability. Mechanical switches can function on the order of 10 ms or slower. Though mechanical switches would provide some benefits, faster switching times would be desired in certain implementations, which may turn to solid-state switches having sub-ms switching times as an alternative. To the extent solid-state switches are considered too costly, gas ionization switches, which are also faster than mechanical switches may be utilized, and/or such other switch types as would occur to those skilled in the art.

Figure 3:
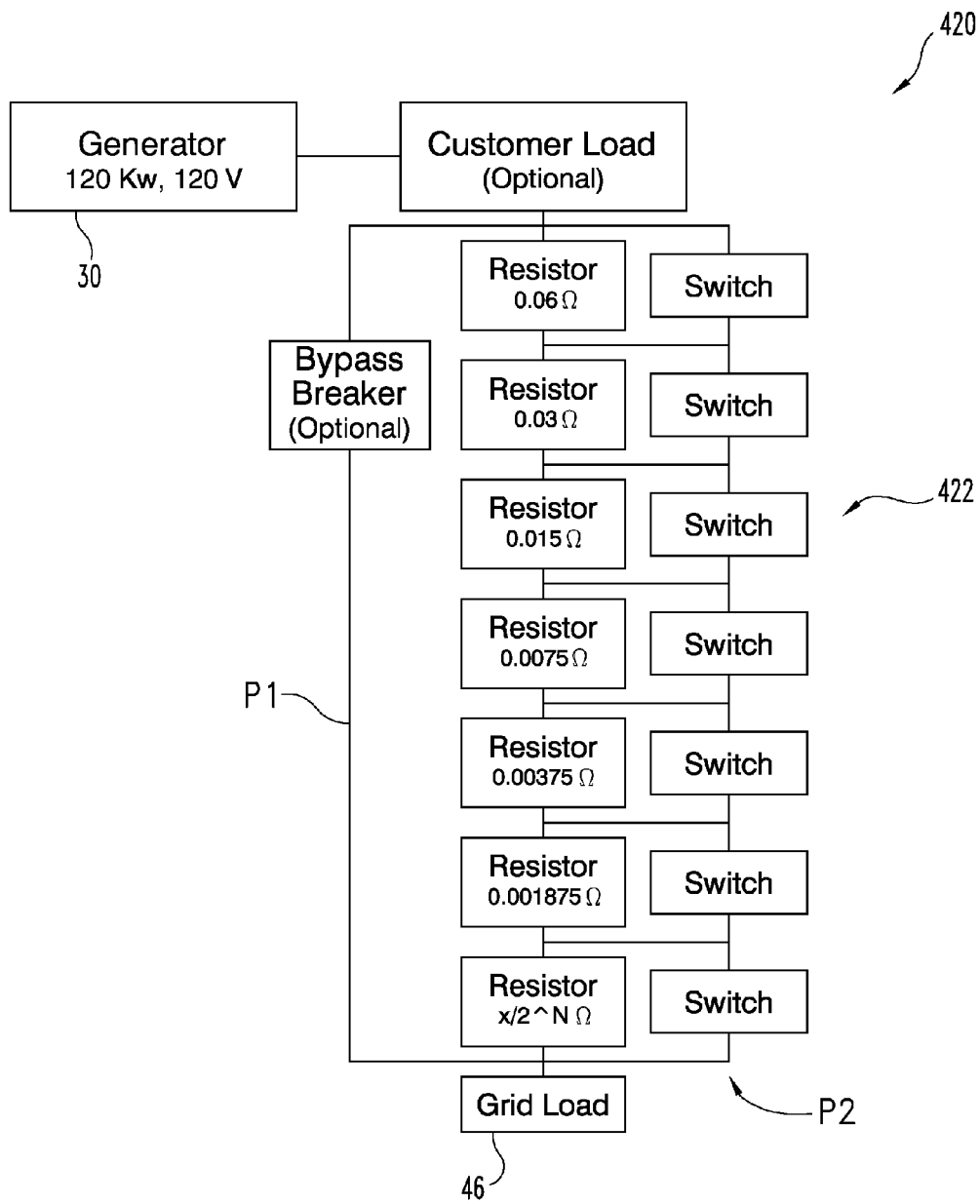
FIG. 3 is a schematic diagram including circuitry for addressing an electric power grid disruption.
Figure 4:
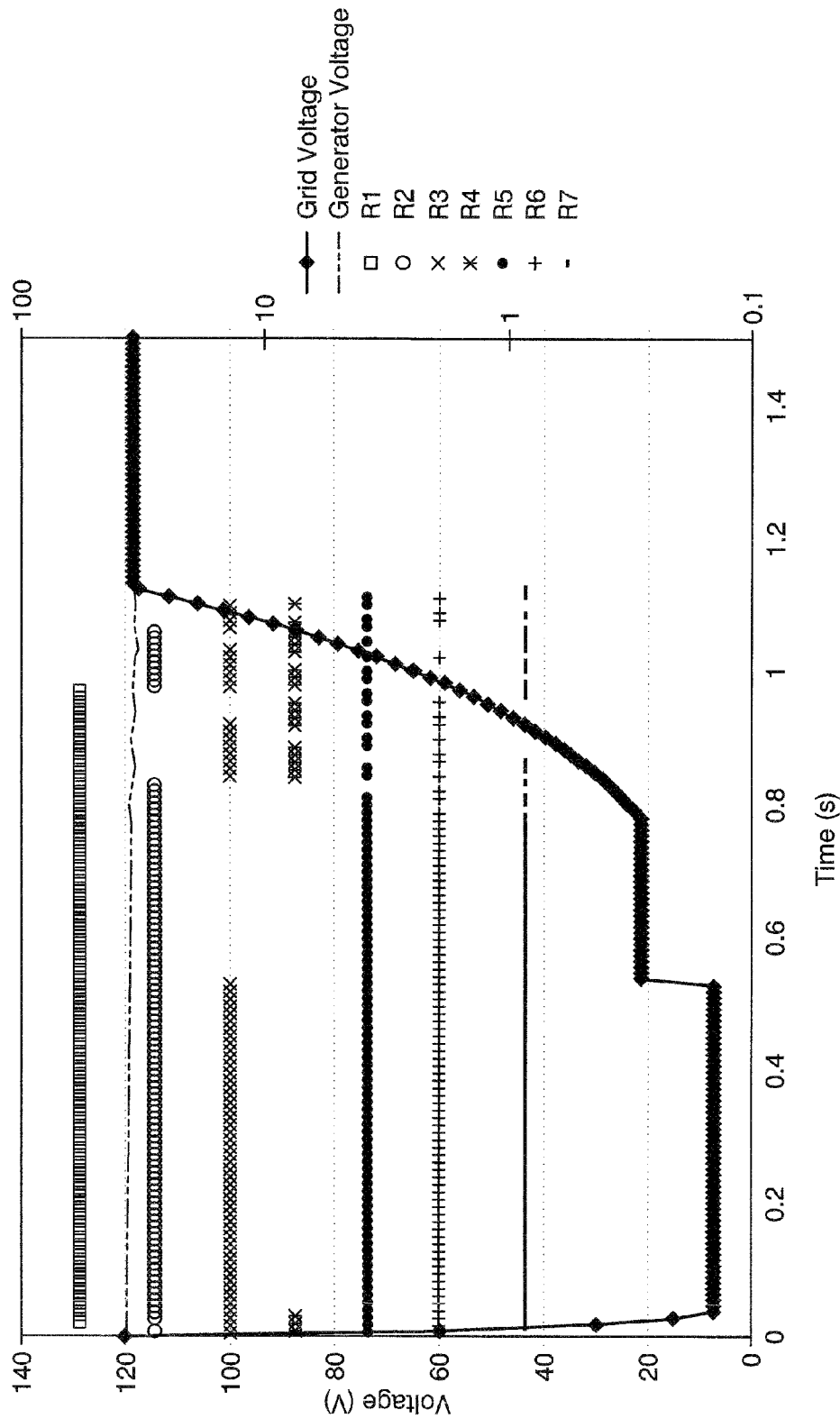
FIG. 4 is a graph illustrating the operation of the circuitry of FIG. 3.

For a typical implementation, the resistor element(s) should be sized to handle 2-20 seconds of use without causing damage such as melting or becoming disfigured from the resistive heating without active cooling. Iron is one nonlimiting example of a common/low-cost material that could provide the conductivity, specific heat, and mass for this application. For example, 50 kg of iron could withstand 1 MW of resistive heating for 5 seconds and increase in temperature by less than 250 K, which would not cause a phase change in the material. After some set amount of time the device would completely decouple the grid from the generator if the undervoltage persists. The FIG. 3 illustration is just one possible example of a resistor/switch network device 422. Voltage control resolution is (Full Voltage)/$2^n$. In this seven (7) resistor example, the resolution is 1/128=0.78%. As shown in FIG. 3, the bypass breaker can provide a minimum resistance pathway P1 during normal operation, and would trip at the beginning of the disturbance, giving the switch/resistor device 422 along pathway P2 control over resistance until the grid stabilized or it is determined that the generator 30 should be decoupled. Typically, a device 422 would be applied to each phase of the generator. FIG. 4 depicts a graph of voltage and resistance during an estimated LVRT event.

The LVRT approach of system 420 can be combined with any of the previously described techniques to address load transients, such as retarded spark timing, skip-firing, spark interruption, fuel injection timing, reduce injected fuel, direct injection interruption (a specific form of injected fuel reduction) and associated variants and controls. Further, it may be implemented in arrangements with or without parallel gensets, and in still other embodiments, may additionally or alternatively include one or more other impedance-altering services such as inductors or capacitors, with or without resistive elements such as those shown; and/or network device 422 may be altogether absent.

In a further embodiment that may be used in concert with or in lieu of spark ignition timing control, fuel injection timing control, and/or a resistive/switching network; the system uses the alternator/generator field to generate a short circuit current and load the engine 24 with torque when the grid load drops. The additional load on the engine may reduce engine acceleration during the voltage drop period. When the voltage drop ends and the grid load returns, the phase difference between the genset 22 and the grid 46 may not be out of synch enough for pole slipping. In one form, this field is controlled by the voltage applied to the excitation windings 32. This voltage control drives the alternator field current to a maximum value to generate a large short circuit current (and power) to help balance engine torque to alternator electromagnetic torque. This torque balance keeps the engine speed from accelerating, and going out of phase relative to the grid voltage.

In one particular embodiment, controller 70 directs the alteration of spark ignition of engine 24 and adjustment of the alternator field in response to a low voltage condition. In a further refinement of this embodiment, the alteration of spark ignition includes retarding spark ignition timing and/or the adjustment to the alternator field includes increasing it to a full field state. For a CI engine, injected fuel amount reduction (including withholding fuel or inhibition—that is reducing the amount to zero) and/or fuel injection retardation may be utilized. In many applications, this combination of engine spark retard/alternator field increase(SI engines) or engine fuel injection modification/alternator field increase (CI engines) provides a desirable way to balance the engine and alternator torque during one of these low voltage events. The system response is as previously disclosed; namely to have the engine control module (ECM) retard the engine ignition timing for an SI engine (or retard/reduce fuel injection for a CI engine) to the minimum desired value, while simultaneously the genset voltage control drives the alternator field current is to a maximum value to generate a large short circuit current (and power) to help balance engine torque to alternator electromagnetic torque. This torque balance keeps the engine speed from accelerating, and going out of phase relative to the grid voltage.

Figure 5:
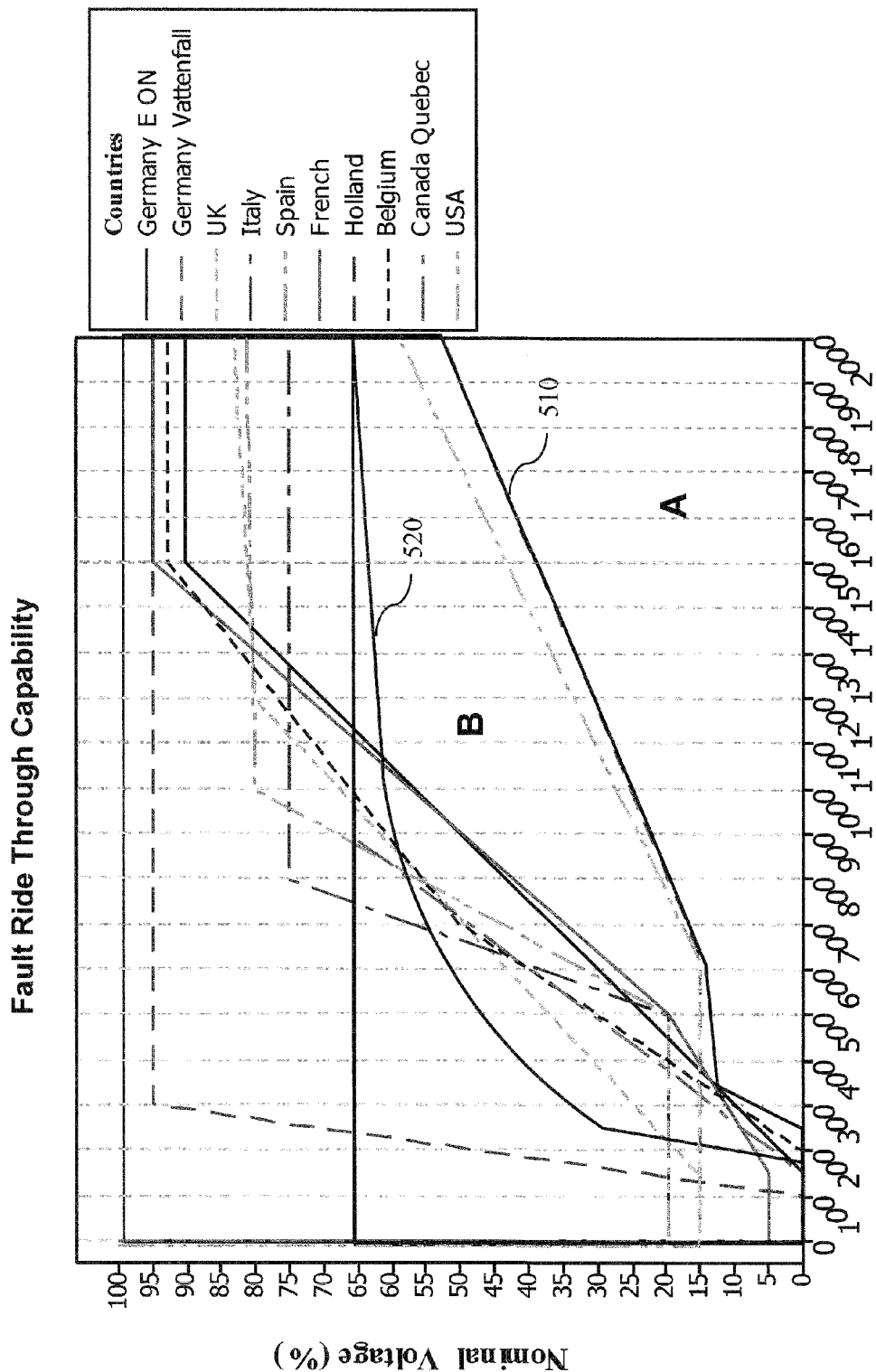
FIG. 5 is graph depicting electric power grid fault tolerance requirements for various countries.

Even so, in still other embodiments, a better balance may be desired. Accordingly, such other embodiments may add other features to the engine spark retard/alternator field increase combination for an SI engine embodiment (or fuel injection modification/alternator field increase combination for a CI engine embodiment) to improve the balance. It should be appreciated that the engine spark retard/alternator field increase for an SI engine application (or fuel injection modification/alternator field increase for a CI engine application) can better enable the addition of such features compared to standard schemes. By way of nonlimiting example, if a brake of some type is used with such combination to absorb excess torque, the sizing/specifications of such a brake can be significantly reduced. In another example, if inertia is added to the system in the form of a flywheel, or larger alternator, the extra inertia required can be significantly reduced when added to the combination. Furthermore, more than one of these features can be added to this combination. Such features further include: (a) a mechanical brake, (b) an exhaust brake such as an exhaust brake of the jake-brake and/or turbocharger-actuated type to name a couple of examples, (c) increased system inertia through sizing of genset components and additional flywheels or the like, and/or (d) switchable impedance to change alternator loading as described in connection with FIG. 3. Alternatively or additionally, the engine spark retard/alternator field increase combination provides a basis for modification of standard components to better take advantage of the combination. For example, one could modify the alternator to go to full field faster and/or to produce more short circuit current (and sooner), which could include: increasing exciter voltage to decrease exciter time constants, removing the on-alternator exciter and using slip rings with a separate energy source to charge the field more quickly, and/or altering other alternator thermal (and electrical) time constants and impedances to support the increase in short circuit currents in both duration and amplitude. In another example on the engine side, it could be modified to improve the robustness of exhaust manifolds or exhaust systems in case of exhaust over pressure events are triggered by spark inhibition or the like. Referring to FIG. 5, the graph provides the standards established for low voltage ride through capabilities of various jurisdictions. For nominal voltage levels and durations that are in Area A near the bottom and to the right of line 510, disconnection from the grid may be allowed. The system of an embodiment of the present invention performs to maintain connection without damage to the components when functioning above and to the left of Area A. When the conditions of the LVRT are within Area B (below line 520 and above line 510), the system may operate with modified spark timing and an increased alternator field to slow the engine and maintain synchronization with the grid.

Figure 6:
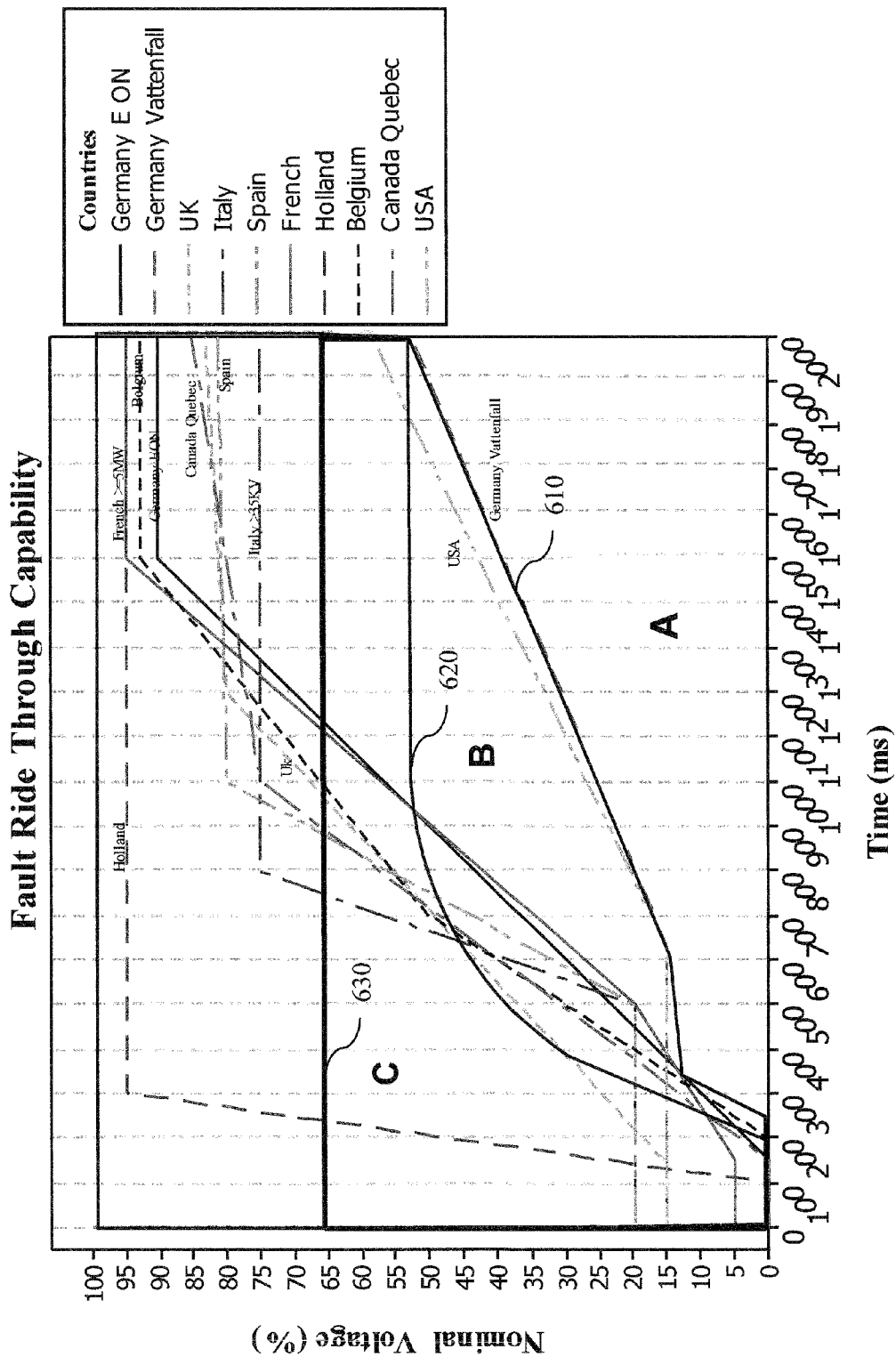
FIG. 6 is a graph depicting certain performance aspects of one embodiment of the present application relative to the fault tolerance requirements shown in FIG. 5.

FIG. 6 shows another graph relating to another embodiment where the system performs various features of the present invention to maintain grid connectivity during a LVRT event with like references relating to like features. For nominal voltage levels and durations that are in Area B, the system may include features such as spark timing modification and an increased alternator field. In Area C above line 620 and below line 630, the system may include features such as a resistive circuit in addition to spark timing modification and an increased alternator field. The system may use these features to keep the genset speed and synchronization within acceptable limits.

In still other embodiments two or more of: a spark ignition timing adjustment for an SI engine, (or fuel injection timing adjustment and/or injected fuel reduction for a CI engine on a per cylinder basis), generator field adjustment, and resistive loading are used in combination. In some implementations, it has been surprisingly discovered that spark ignition retardation and increasing the generator field voltage is desirable.

In further embodiments, one or more of spark ignition timing adjustment for an SI engine (or adjustment of fuel injection timing and/or a reduced amount of injected fuel controllable at the cylinder level for a CI engine), generator field adjustment, and resistive loading are used in combination with one or more other techniques, such as the inertia increase provided by a flywheel on a power shaft of the genset, an otherwise over-sized generator or alternator, a brake of some sort, like an engine exhaust brake, or the like.

Additionally or alternatively, the alternator/generator could be modified to go to full field faster, and to produce more short circuit current (and sooner). Such things might include increasing exciter voltage to decrease exciter time constants, removing the on alternator/generator exciter and using slip rings with a separate energy source to charge the field quicker. Altering other alternator thermal (and electrical) time constants and impedances to support the increase in short circuit currents in both duration and amplitude and the like.

Many further embodiments of the present application are envisioned. Among the inventions desired to be protected are:

A method, comprising: providing electric power to a utility grid, which includes driving an electric power generator coupled to the grid with a spark-ignited internal combustion engine; detecting a change in electrical loading of the generator; in response to the change, changing spark ignition of the engine to adjust power provided by the engine. In one further form of this method, the changing of spark ignition includes retarding spark timing. In another form of this method, the changing of spark ignition includes interrupting the spark ignition.

An inventive apparatus comprising: a genset including an electric power generator structured for coupling to an electric power grid, a spark-ignited internal combustion engine to drive the generator, a controller structured to regulate operation of the genset; wherein the controller executes operating logic to detect a change in electrical loading of the generator and in response to the change, to adjust spark ignition of the engine. The adjustment of spark ignition may include retarding spark timing and/or interrupting the spark ignition in inventive variations of the apparatus.

A further inventive apparatus comprising: a genset including an electric power generator, a spark-ignited internal combustion engine to drive the generator, means for providing electric power generated from the generator to a utility grid, means for detecting a change in electrical loading of the generator, and means for adjusting spark ignition of the engine in response to the change.

In further inventive forms, the adjusting means includes means for retarding spark timing and/or means for interrupting the spark ignition.

In another embodiment, an inventive method comprises: providing electric power to a utility grid, which includes driving an electric power generator coupled to the grid with an internal combustion engine; detecting a change to a low voltage condition on the grid; in response to the low voltage condition, routing electric current output by the generator from a less electrically resistive pathway to a more electrically resistive pathway to absorb excess energy, and returning the electric current output to the less electrically resistive pathway after the low voltage condition ceases. Further inventive method variations include: providing a series of resistors and switches to adjust electrical resistance along the more electrically resistive pathway, providing a switch to electrically open or close the less electrically resistive pathway, providing an electrical load between the generator and the pathways, maintaining engine speed and/or synchronization with the grid, and/or addressing an electrical load transient by adjusting spark ignition in response to detection of such transient.

Still another inventive apparatus comprises: a genset including an electric power generator structured for coupling to an electric power grid, a spark-ignited internal combustion engine to drive the generator, a controller structured to regulate operation of the genset; wherein the controller executes operating logic to detect a change in electrical loading of the generator and in response to the change, to adjust spark ignition of the engine. The adjustment of spark ignition may include retarding spark timing and/or interrupting the spark ignition in various other inventive forms.

A further inventive apparatus comprises: a genset including an electric power generator, an engine to drive the generator, means for detecting a change to a low voltage condition on the grid; in response to the low voltage condition, means for routing electric current output by the generator from a less electrically resistive pathway to a more electrically resistive pathway to absorb excess energy; and means for returning the electric current output to the less electrically resistive pathway after the low voltage condition ceases. Additionally, inventive apparatus variations thereof include means for providing a series of resistors and switches to adjust electrical resistance along the more electrically resistive pathway, means for providing a switch to electrically open or close the less electrically resistive pathway, means for providing an electrical load between the generator and the pathways, means for maintaining engine speed and/or synchronization with the grid, and/or means for addressing an electrical load transient by adjusting spark ignition in response to detection of such transient.

Yet another inventive apparatus comprises: a genset including an electric power generator structured to provide electric power to a power utility grid, an engine to drive the generator, and circuitry selectively coupling the generator to the grid including a first electrical pathway and a second electrical pathway in parallel with the first electrical pathway, the first pathway being less electrically resistive than the second pathway, and a controller structured to execute operating logic to detect a low voltage condition on the grid and route electric current from the generator from the first pathway to the second pathway to absorb excess energy and to adjust resistance of the second pathway. Additional inventive features thereof include means for rerouting the current to flow through the first path after the low voltage condition ceases, and/or wherein the second pathway includes a number of switches and resistors to provide a switch-adjustable variable resistance, and/or wherein the first pathway includes a switch in the form of a circuit breaker.

In another embodiment, a method includes: providing electric power to a utility grid, which includes driving a field-adjustable alternator coupled to the grid with a spark-ignited internal combustion engine; detecting a low voltage condition of the utility grid; and, in response to the low voltage condition changing spark ignition of the engine and adjusting a field produced by the alternator.

Also embodiments of the present application include an apparatus comprising: an electric power generator structured for coupling to an electric power grid; a spark-ignited internal combustion engine to drive the generator; a sensing device; and a controller responsive to the sensing device to regulate operation of the generator and the engine. The controller is structured to determine a low voltage condition of the electric power grid and in response to the low voltage condition to provide one or more output signals to change spark ignition of the engine and adjust a field of the generator.

A further embodiment includes an apparatus, comprising: a genset including an adjustable-field alternator and a spark-ignited internal combustion engine to drive the alternator. The genset is operable to interface with a public utility grid and includes a controller. The controller includes: means for determining a low voltage condition of the utility grid; and means for responding to the low voltage condition including means for increasing engine load and means for reducing engine speed.

Still a further embodiment is directed to a technique, comprising: driving an electric power generator with a spark-ignited internal combustion engine to provide electric power to a utility grid; determining a low voltage condition of the utility grid;

and in response to the low voltage condition, changing spark ignition of the engine to control engine speed.

Yet a further embodiment is directed to a genset. The genset includes: an electric power generator structured for coupling to an electric power grid; a sensing device; a spark-ignited internal combustion engine to drive the generator; and a controller structured to regulate operation of the genset. The controller is responsive to the sensing device to determine a low voltage condition of the electric power grid and provide one or more output signals to adjust spark ignition of the engine in response to the low voltage condition.

In another embodiment, a method includes: providing electric power to a utility grid, which includes driving an adjustable field electric power generator coupled to the grid with an internal combustion engine; detecting a low voltage condition of the utility grid; and in response to the condition, increasing a field of the generator to increase torque on the generator.

A further embodiment is directed to a genset including: an electric power generator structured for coupling to an electric power grid; a sensing device; a spark-ignited internal combustion engine to drive the generator; and a controller structured to regulate operation of the genset. The controller is responsive to the sensing device to determine a low voltage condition of the electric power grid and in response to the condition to provide one or more output signals to increase an adjustable field of the generator.

In another embodiment, a method includes: providing electric power to a utility grid, which includes driving an electric power generator coupled to the grid with a compression-ignited internal combustion engine; detecting a change in electrical loading of the generator; in response to the change, changing direct injection of fuel to the engine to adjust power provided by the engine. In one further form of this method, the changing of compression ignition includes retarding direct fuel injection timing. In another form of this method, the changing of compression ignition includes interrupting the direct fuel injection. In a further form of this method, the changing of compression ignition includes changing the amount of fuel injected in the direct fuel injection.

A further inventive apparatus comprises: a genset including an electric power generator structured for coupling to an electric power grid, a direct fuel injection compression-ignition internal combustion engine to drive the generator, a controller structured to regulate operation of the genset; wherein the controller executes operating logic to detect a change in electrical loading of the generator and in response to the change, to adjust compression ignition of the engine. The adjustment of compression ignition may include retarding direct fuel injection timing, reducing direct fuel injection fuel amount and/or interrupting the direct fuel injection in inventive variations of the apparatus.

Still another inventive apparatus comprises: a genset including an electric power generator, a direct fuel injection compression-ignition internal combustion engine to drive the generator, means for providing electric power generated from the generator to a utility grid, means for detecting a change in electrical loading of the generator, and means for adjusting compression ignition of the engine in response to the change. In further inventive forms, the adjusting means includes means for retarding direct fuel injection timing, reducing direct fuel injection fuel amounts and/or interrupting the direct fuel injection.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein are desired to be protected.

What is claimed:

1. A method, comprising:
providing electric power to a utility grid, which includes driving a field-adjustable alternator coupled to the grid with a spark-ignited internal combustion engine;
detecting a low voltage condition of the utility grid;
in response to the low voltage condition:
changing spark ignition of the engine, the changing of the spark ignition including retarding a timing of the spark ignition so as to preserve synchronization with the utility grid; and
adjusting a field produced by the alternator,
wherein the retarding the timing of the spark ignition comprises modulating the timing between a maximum retarded timing and a nominal timing based on a speed of the engine during the low voltage condition.

2. The method of claim 1, wherein the adjusting of the field includes changing to a full field state of the alternator.

3. The method of claim 1, which further includes braking at least one of the alternator and the engine in response to the low voltage condition.

4. The method of claim 1, which further includes switching in an impedance circuit to increase electrical load on the alternator in response to the low voltage condition.

5. The method of claim 1, wherein the changing of the spark ignition includes retarding spark ignition timing.

6. The method of claim 1, wherein the adjusting of the field includes adjusting to a full field state in response to a field control voltage.

7. The method of claim 1, which includes:
operating the alternator and the engine as a genset regulated with a controller;
performing the changing of the spark ignition timing and the adjusting of the field in accordance with operating instructions executed with the controller;
performing the detecting of the low voltage condition by sensing voltage with one or more sensors; and
fueling the engine with a gaseous type of fuel.

8. An apparatus comprising:
an electric power generator configured to couple to an electric power grid;
a spark-ignited internal combustion engine to drive the generator;
a sensing device; and
a controller responsive to the sensing device to regulate operation of the generator and the engine, the controller being configured:
to determine a low voltage condition of the electric power grid, and
in response to the low voltage condition, to
provide one or more output signals to change spark ignition of the engine and adjust a field of the generator, the changing of the spark ignition including retarding a timing of the spark ignition so as to reduce power output and preserve synchronization with the utility grid,
wherein the retarding the timing of the spark ignition comprises modulating the timing between a maximum retarded timing and a nominal timing based on a speed of the engine during the low voltage condition.

9. The apparatus of claim 8, wherein the controller is configured to execute programming operable to adjust the field by increasing to a full field state of the generator.

10. The apparatus of claim 9, wherein the controller is configured to generate the one or more output signals to change the spark ignition by retarding spark ignition timing of the engine.

11. The apparatus of claim 10, wherein the generator, the engine, the sensing device, and the controller are provided as a genset, and the controller includes an engine control module and one or more other control devices.

12. The apparatus of claim 11, wherein the engine is of a multiple cylinder, reciprocating piston type.

13. The apparatus of claim 12, further comprising a fuel source containing a gaseous fuel for the engine.

14. A method, comprising:
providing electric power to a utility grid, which includes driving a field-adjustable alternator coupled to the grid with a direct injection compression-ignition internal combustion engine with fuel injection;
detecting a low voltage condition of the utility grid;
in response to the low voltage condition:
changing ignition of the engine by altering the fuel injection, the altering of the fuel injection including retarding a timing of the fuel injection so as to reduce engine power output and preserve synchronization with the utility grid; and
adjusting a field produced by the alternator,
wherein the fuel injection is altered when a speed of the engine exceeds an upper threshold, and
wherein the fuel injection is restored to an unaltered state once the speed drops below a lower threshold.

15. The method of claim 14, wherein the adjusting of the field includes changing to a full field state of the alternator.

16. The method of claim 14, wherein the changing of the ignition includes at least one of retarding timing of the fuel injection and reducing an amount of injected fuel.

17. The method of claim 16, wherein the reducing of the amount of injected fuel includes withholding fuel from a cylinder of the engine.

18. An apparatus comprising:
an electric power generator configured to couple to an electric power grid;
a compression ignition internal combustion engine to drive the generator, the engine including one or more cylinders with fuel injection;
a sensing device; and
a controller responsive to the sensing device to regulate operation of the generator and the engine, the controller being configured:
to determine a low voltage condition of the electric power grid, and
in response to the low voltage condition,
to provide one or more output signals to change the fuel injection to alter engine ignition and adjust a field of the generator, the changing of the fuel injection including one or more of halting injection, reducing an amount of injected fuel, and retarding injection timing on one or more cylinders of the engine so as to reduce engine power output and preserve synchronization with the electric power grid, wherein the fuel injection is changed when a speed of the engine exceeds an upper threshold, and restored to an unaltered state once the speed drops below a lower threshold.

19. The apparatus of claim 18, wherein the controller is configured to execute programming operable to provide the change to the fuel injection by retarding the fuel injection and adjust the field by increasing to a full field state of the generator.

20. The method of claim 14, which further includes braking at least one of the alternator and the engine in response to the low voltage condition, wherein the braking includes applying an exhaust brake.

* * * * *